Figure 7:
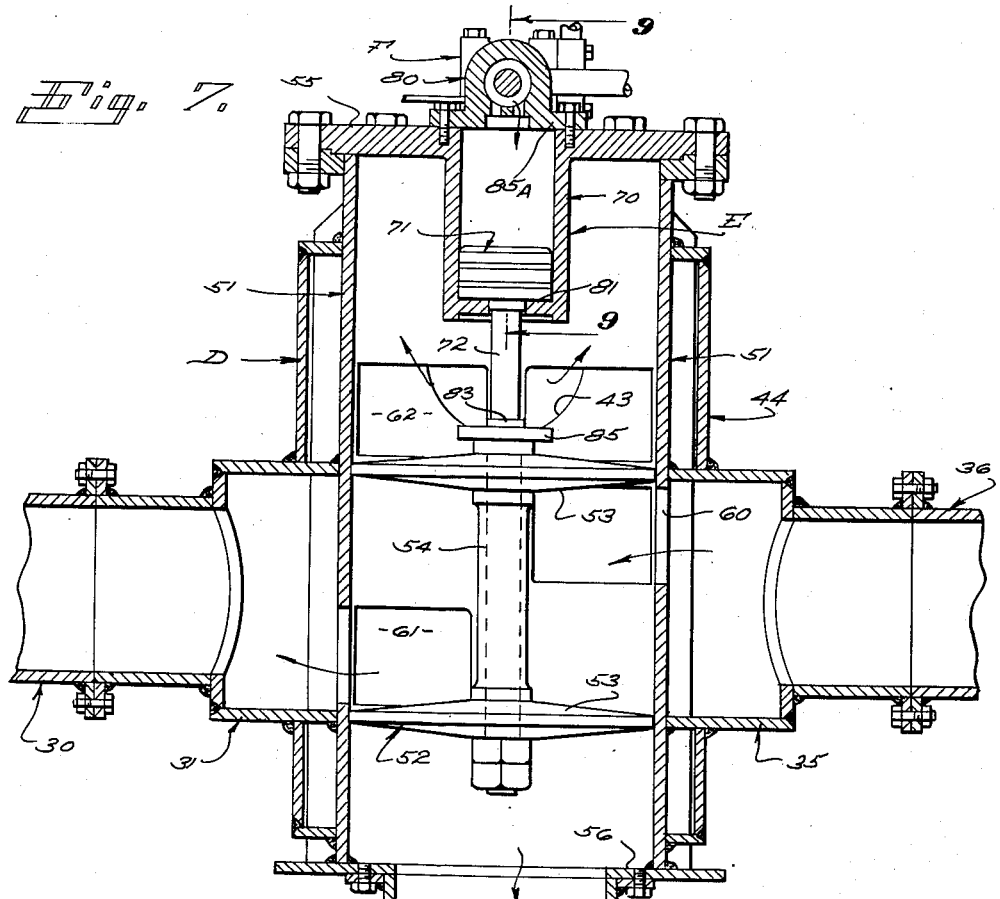

Jan. 12, 1954
H. HARVEY
2,665,550
FLUID PRESSURE ACTUATED PUMPING UNIT
Filed Feb. 25, 1949
7 Sheets-Sheet 1
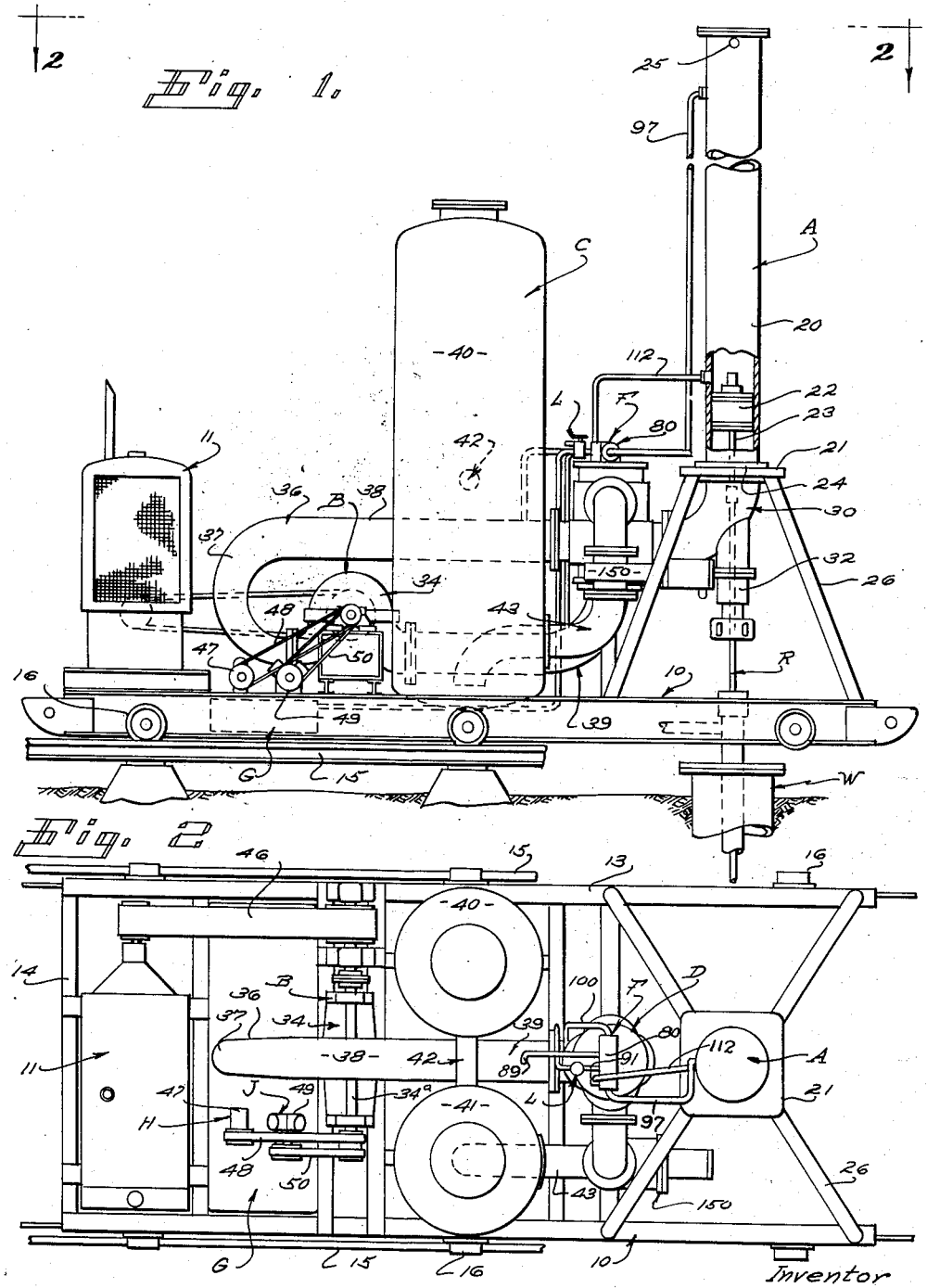
Inventor
Herbert Harvey
By
Attorney Jan. 12, 1954        H. HARVEY        2,665,550
FLUID PRESSURE ACTUATED PUMPING UNIT
Filed Feb. 25, 1949        7 Sheets-Sheet 2
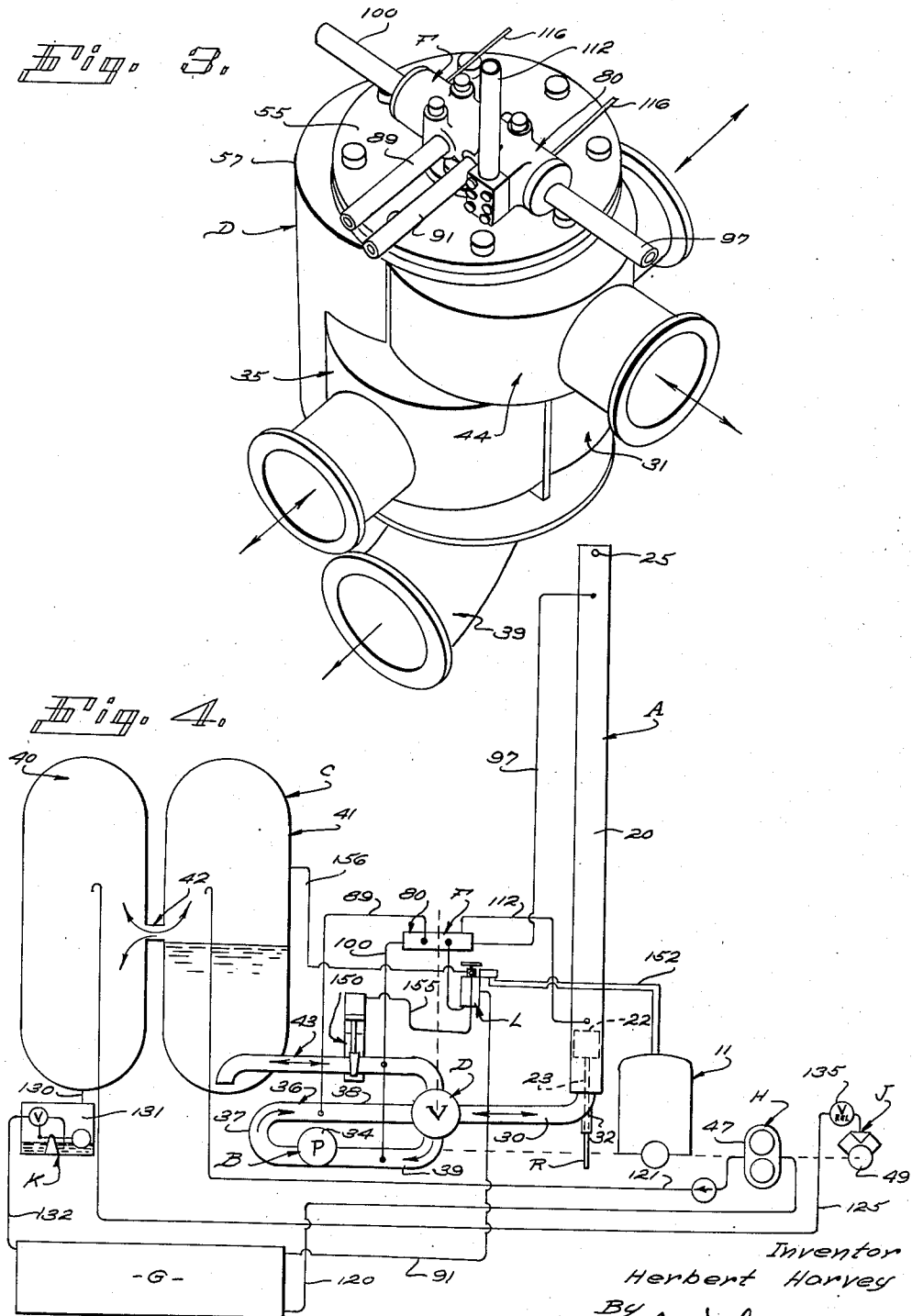
Inventor
Herbert Harvey
By
Attorney

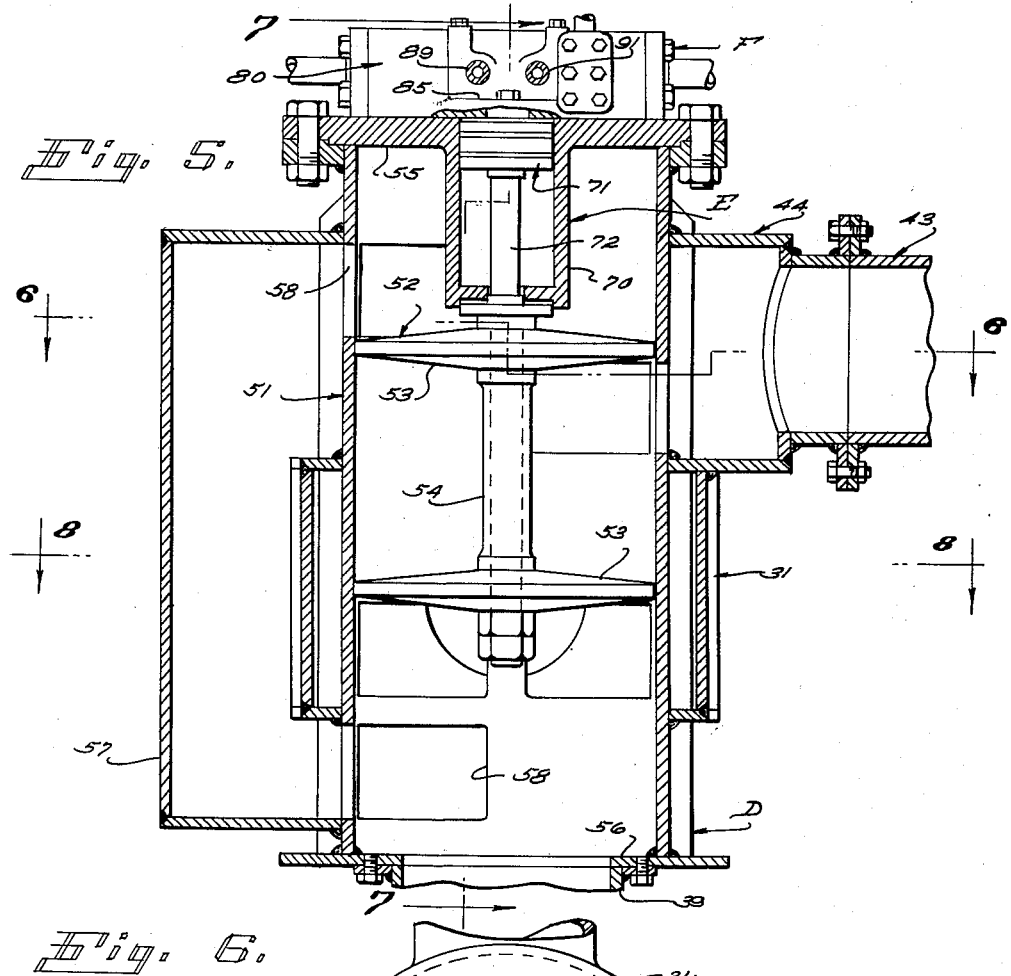

Jan. 12, 1954  H. HARVEY  2,665,550
FLUID PRESSURE ACTUATED PUMPING UNIT
Filed Feb. 25, 1949  7 Sheets-Sheet 4

Inventor
Herbert Harvey
By
Attorney

Jan. 12, 1954
H. HARVEY
2,665,550
FLUID PRESSURE ACTUATED PUMPING UNIT
Filed Feb. 25, 1949
7 Sheets-Sheet 5
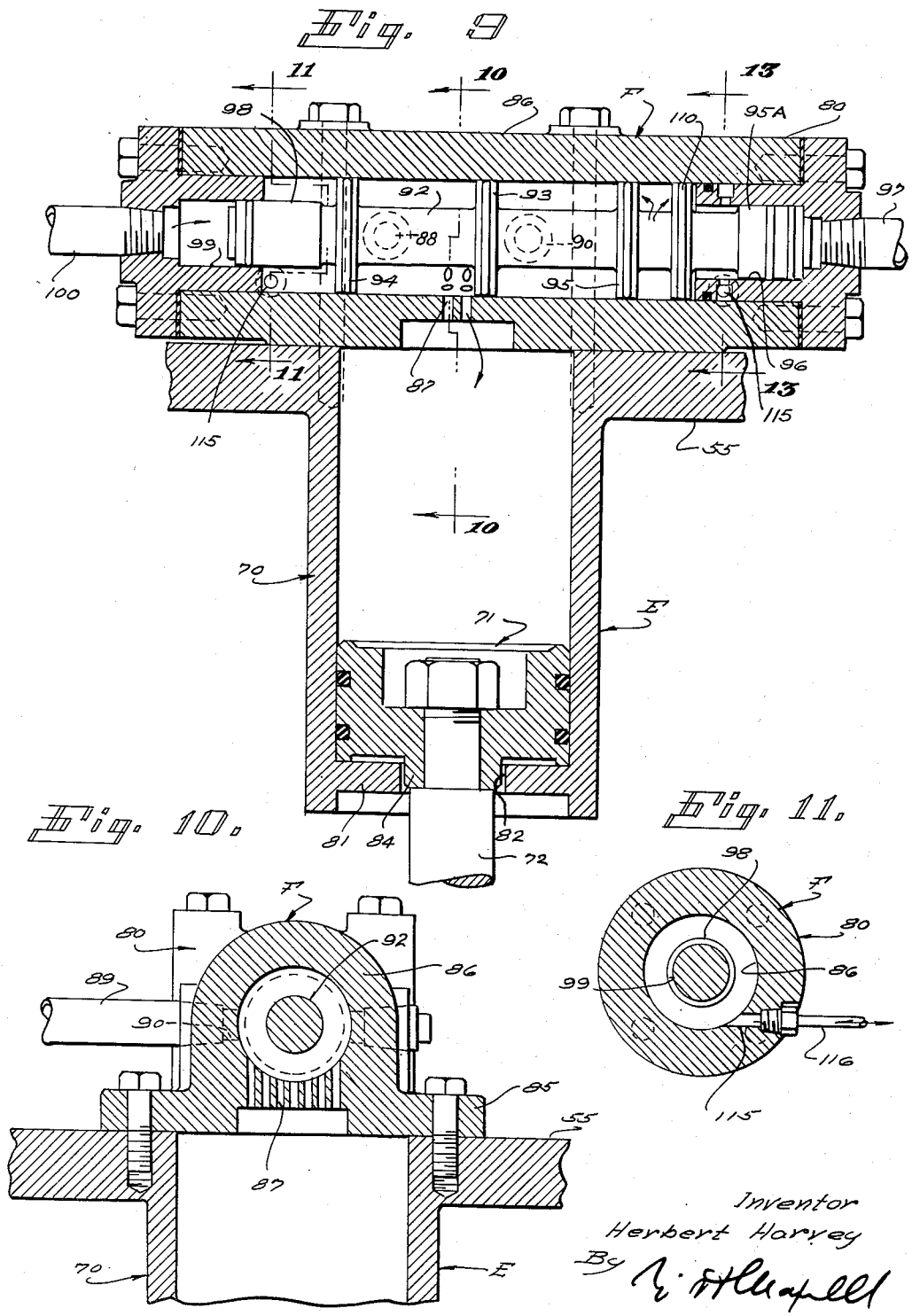

Jan. 12, 1954  H. HARVEY  2,665,550
FLUID PRESSURE ACTUATED PUMPING UNIT
Filed Feb. 25, 1949  7 Sheets-Sheet 6
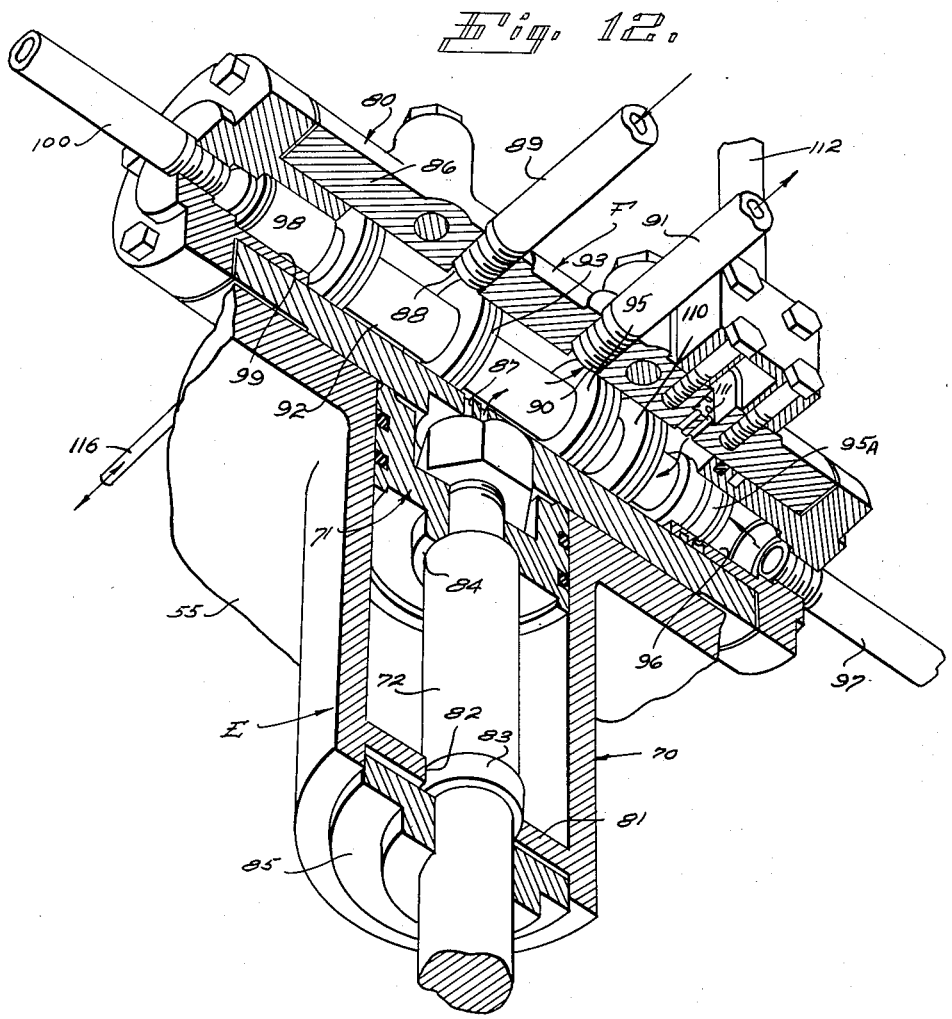
Fig. 12.
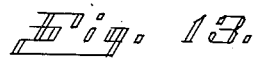
Fig. 13.
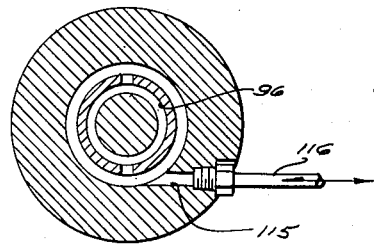
Inventor
Herbert Harvey
By
Attorney

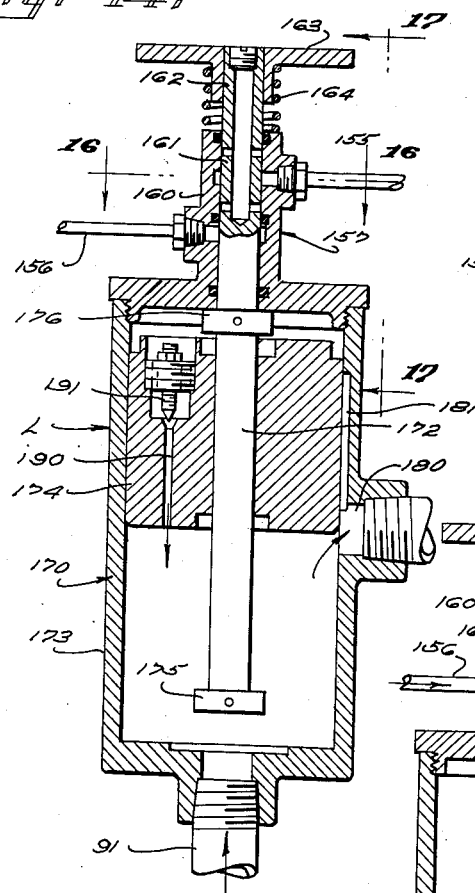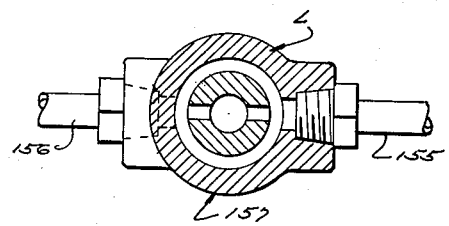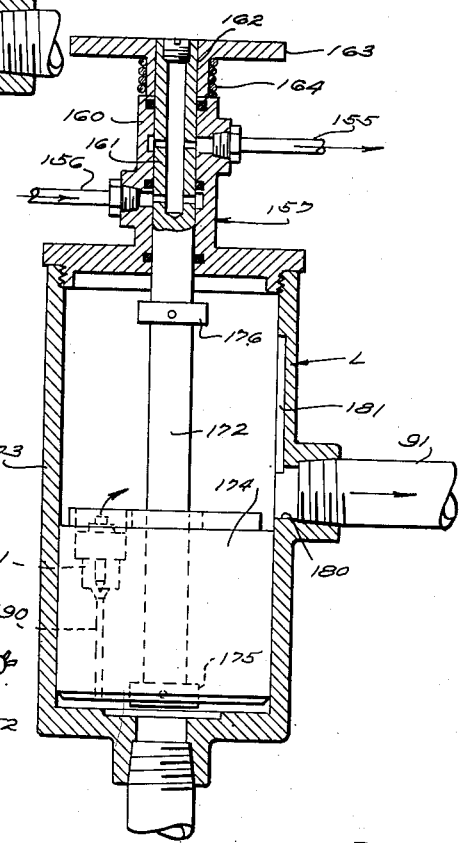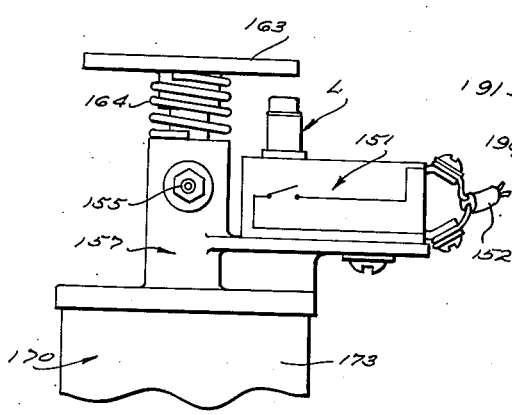

Patented Jan. 12, 1954

2,665,550

UNITED STATES PATENT OFFICE 2,665,550

FLUID PRESSURE ACTUATED PUMPING UNIT

Herbert Harvey, Los Angeles, Calif., assignor, by mesne assignments, to United States Steel Corporation, a corporation of New Jersey Application February 25, 1949, Serial No. 78,294

10 Claims. (Cl. 60—51)

This invention is concerned with a fluid pressure actuated pumping unit, it being a general object of the invention to provide a simple, practical, improved mechanism particularly useful for the operation of well pumps.

The structure provided by this invention is particularly practical for the operation of well pumps and it has certain advantages over ordinary pump operating devices, in that it serves to operate a pump rod or sucker rod through a long stroke, all of which is particularly desirable in the case of deep wells.

A general object of this invention is to provide a pumping unit utilizing a constantly operating pump so that the output from the pump is efficiently handled to move a pump rod in one direction and to accumulate pressure while the pump rod is moving in the other direction.

Another object of the invention is to provide a mechanism of the general character referred to wherein the various parts or essential elements are so combined, arranged and related that flow of the operating medium or fluid is handled in a most efficient manner. With the construction provided by the invention the fluid connections handling the operating fluid are short, simple, direct connections serving to handle the fluid with a minimum of friction.

It is another object of this invention to provide a mechanism of the general character referred to wherein a main valve controls the output from the constantly operating pump and an operator is provided for the main valve, which operator is actuated by fluid pressure so that a minimum amount of fluid is consumed in operation of the mechanism.

It is a further object of the invention to provide apparatus of the general character referred to wherein there is a simple cylinder and piston mechanism provided to operate the main control valve, and a fluid pressure actuated control governs action of the said cylinder and piston mechanism, the entire structure being such that fluid under pressure is exhausted from the system only during one stroke of the operating piston.

It is a further object of this invention to provide a mechanism of the general character referred to which includes a feed pump serving to handle fluid that may leak or be exhausted from the mechanism to deliver such fluid back to the mechanism under the head pressure maintained in the mechanism. By providing a mechanism wherein a minimum amount of fluid is exhausted in the course of operation and in which there is a minimum amount of fluid lost through leakage, the feed pump may be of minimum size and its operation need only consume a minimum of power.

It is another object of this invention to provide a mechanism of the general character referred to wherein the various parts of the mechanism are so combined and related as to form a closely coupled assembly practical for mounting it on or immediately adjacent a well and such that the structure is inexpensive of manufacture, is simple and dependable in operation, and is highly efficient in action.

Another object of the invention is to provide a mechanism of the general character referred to including stop or control means by which operation is stopped in the event that parts fail or lag for any reason so that the mechanism fails to operate in a predetermined manner.

Figure 8:
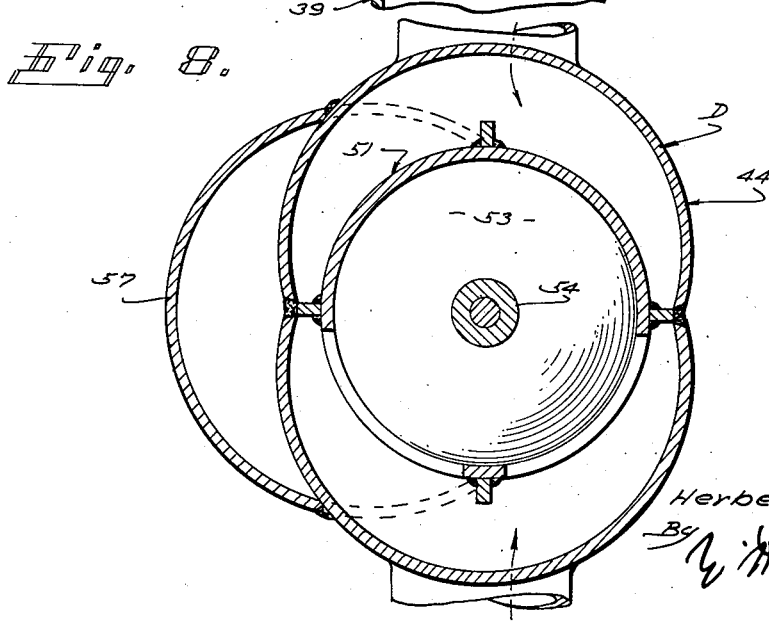

The various objects and features of my invention will be fully understood from the following detailed description of a typical preferred form and application of the invention, throughout which description reference is made to the accompanying drawings, in which:

Fig. 1 is a side elevation of the mechanism provided by the present invention, showing it operatively related to a well from which a sucker rod projects, certain of the parts being broken away to show in section. Fig. 2 is a plan view of the structure shown in Fig. 1, being a view taken as indicated by line 2—2 on Fig. 1. Fig. 3 is a perspective view of a part of the mechanism separate from other elements, being a view showing the general relationship provided between the main control valve and the pilot valve of the control means. Fig. 4 is a diagrammatic view illustrating the general hydraulic system provided by the present invention. Fig. 5 is an enlarged, vertical detailed sectional view of the main control valve and the parts immediately combined therewith, showing the parts in position in which they occur during downward movement of the sucker rod being operated by the mechanism. Fig. 6 is a detailed transverse sectional view of the mechanism shown in Fig. 5, being a view taken as indicated by line 6—6 on Fig. 5. Fig. 7 is a view similar to Fig. 5, showing the manner in which the parts are positioned during upward movement of the sucker rod operated by the device and showing the mechanism viewed in the direction indicated by line 7—7 on Fig. 5. Fig. 8 is a transverse sectional view similar to Fig. 6, taken as indicated by line 8—8 on Fig. 5. Fig. 9 is an enlarged detailed sectional view of a portion of the mechanism, being a view taken as indicated by line 9—9 on Fig. 7. Fig. 10 is a transverse sectional view taken as indicated by line 10—10 on Fig. 9. Fig. 11 is a transverse sectional view taken as indicated by line 11—11 on Fig. 9. Fig. 12 is a perspective view of the mechanism illustrated in Figs. 9 and 10, showing a portion of the structure in section to illustrate the working parts thereof, and showing the parts in a position opposite to that illustrated in Fig. 9. Fig. 13 is a transverse sectional view taken as indicated by line 13—13 on Fig. 9. Fig. 14 is an enlarged detailed sectional view of a part of the stop means showing the parts ready to start a cycle of operation. Fig. 15 is a view similar to Fig. 14, showing the parts fully operated. Fig. 16 is an enlarged transverse sectional view as indicated by line 16—16 on Fig. 14, and Fig. 17 is a view taken as indicated by line 17—17 on Fig. 14.

The pumping unit provided by the present invention involves, generally, a jack A carried by a frame 10 and actuated over a well W to operate the sucker rod R projecting from the well, a high pressure fluid supply B preferably in the form of a constantly operating centrifugal pump driven by a suitable prime mover 11, a pressure accumulator C, a main control or working valve D, operating means E for the valve D preferably in the form of a cylinder and piston mechanism, control means F for the operating means E characterized by a pilot valve and a plurality of suitably arranged fluid connections, a fluid reservoir G carrying a suitable reserve supply of operating fluid and serving as a receptacle or catcher for overflow, a liquid make-up or feed means H, an air supply J, an overflow control K, stop means L and various other parts and features of construction as will appear from the following description or from examination of the drawings.

The frame 10 in the case illustrated is an elongate base-like structure characterized by parallel beams 13 joined by transverse braces 14. The beams project freely at one end of the frame to straddle the head end of the well W and, in practice, the frame may be supported on rails 15 through wheels 16 so that it can be readily moved into and out of operating position such as is shown in Fig. 1. When the frame is out of operating position it is removed from the well, leaving the head of the well clear so that it is accessible for various servicing operations, or the like.

The jack A is characterized by a vertically disposed cylinder 20 supported by a table 21 so that it is normally concentric with the well W. A piston or ram 22 operates in the cylinder 20 and has a rod 23 depending through the head 24 that closes the lower end of the cylinder 20, which rod is coupled to the sucker rod R so that as the piston is reciprocated in the cylinder 20 the rod is reciprocated in the well. The upper end of cylinder 20 is open to atmosphere as by a vent opening 25. It is to be understood, of course, that the cylinder 20 may be of any suitable diameter and length and the jack A may, in practice, be provided with various features or accessories characteristic of such devices. In the case illustrated the table 21 which supports the cylinder 20 is carried by the frame 10 through suitable legs 26 so that the lower end of cylinder 20 is supported a suitable distance above the head of the well W.

In accordance with the present invention the general arrangement and relationship of parts is highly important. In the preferred form of the invention the elongate frame 10 is related to the well W to normally project laterally therefrom, as shown in Figs. 1 and 2 of the drawings, and the main valve D is located centrally of the frame to be laterally offset from the jack A and well W. A side outlet of the valve D is joined directly to the lower end of the jack A by an elbow 30, which is connected to a manifold 31 at one side of valve D and to the lower end of the cylinder 20 through the table 21 which supports the cylinder 20. In accordance with the present invention the elbow 30 is provided with a packing gland 32 through which the rod R or an extension of rod 23 is passed, as clearly shown in Fig. 1 of the drawings.

The high pressure fluid supply B preferably in the form of a constantly operated centrifugal motivating pump 34 is located centrally of the frame 10 and is spaced from the valve D outward of or beyond the valve relative to the jack A. The pump 34 is shown as a conventional centrifugal pump the axis of which is transverse of the frame 10. The outlet of pump 34 is shown coupled to a manifold 35 at one side of the valve D by a pipe 36, which pipe has a semi-circular neck 37 coupled to the pump and a leg portion 38 which extends horizontally from the neck and connects to the manifold 35. It is to be observed that the manifold 35 of valve D is located diametrically opposite manifold 31 and from the description to follow it will appear that this arrangement permits of flow straight through the valve D from pipe 36 to elbow 30 when fluid is being supplied to operate the jack A.

The intake or suction of pump 34 is connected to the bottom or lower end of valve D by a pipe 39 which extends horizontally from the pump beneath the leg 38 of pipe 36 to the valve D where it turns up and connects with the valve. The accumulator C in the preferred form of the invention is characterized by like tanks 40 and 41, preferably vertically disposed cylindrical elements or cells closed at their ends, which tanks are joined by a suitable fluid connection 42. In accordance with the arrangement of the present invention the tanks 40 and 41 are located on the frame 10 between valve D and pump 34 and they are spaced apart transversely of the frame to pass the pipes 36 and 39, as clearly shown in Figs. 1 and 2 of the drawings. A pipe 43 extends from tank 41 of the accumulator to a manifold 44 at one side of valve D.

In practice it is desirable to drive the pump 34 by a prime mover in the form of an engine 11 and it is preferred to locate the engine on the frame 10 outward of or beyond the pump 34, in which case it is practical to drive the pump from the engine through a flexible drive such as a belt drive 46. The reservoir G is shown located in the frame 10 between the pump and prime mover and the make-up means H is shown as involving, primarily, a suitable pump 47 located above the reservoir G and driven from an extension of the pump shaft 34ª by a belt 48. The air supply means J is shown characterized by an air pump 49 located adjacent pump 47 and driven from shaft 34ª by a belt 50.

It is to be observed that the various general elements of the structure hereinabove referred to are all located on or carried by the frame 10 and they are so arranged and related as to form a compact practical accessible assembly in which the main fluid handling parts such as the valve D, the pump 34 and the pipes 30, 36 and 39 are in line, or in a common plane radial of the well W. More specifically it is to be observed that the valve D, the pump 34 and the pipes 30 and 36 are so arranged and coupled as to form a simple, annular assembly or loop disposed in a vertical plane, which structure handles fluid in a most direct, simple, and efficient manner.

The main working valve D is preferably a slide or piston type valve and in the preferred arrangement the cylinder 51 of valve D is vertically disposed and carries the valve element 52, which is characterized by spaced heads 53 on a common central stem 54. A cylinder head 55 closes the upper end of cylinder 51 while a head 56 closes the lower end of the cylinder and serves as the part to which pipe 39 is connected, as shown throughout the drawings.

A manifold 57 on the exterior of cylinder 51 extends between and connects side ports 58 in the cylinder 51 at the end portions thereof. The manifold 57 in connecting the ports 58 serves to maintain equal pressure in the end portions of cylinder 51. Since the lower end portion of cylinder 51 is connected to the suction of pump 34 by the pipe 39, the pressure prevailing in the end portions of cylinder 51 is generally a low pressure or, at least, that at which fluid is fed or delivered to the pump 34.

The manifold 35 located at the exterior of cylinder 51 connects with pipe 36 and is open to a side port 60 in cylinder 51, which port is located about midway between the ends of the cylinder. The manifold 31 connected to elbow 30 communicates with a side port 61 in cylinder 51, which port 61 is spaced axially from the port 60, preferably below port 60, as shown in Fig. 7 of the drawings. A side port 62 in cylinder 51 is spaced above port 60 and communicates with the manifold 44 on the exterior of the cylinder 51, which manifold is in communication with pipe 43 which connects the valve D with tank 41 of the accumulator C.

The heads 53 of the valve element 52 are spaced apart by the stem 54 and are piston-like parts slidably operating in cylinder 51. When the valve element is in a down position, such as is shown in Fig. 7, the lowermost head 53 separates the port 61 from the lower end portion of the cylinder which is open to the pipe 39, while the uppermost head 53 separates port 60 from port 62. With this setting of the valve D, fluid under high pressure from the pump 34 enters the valve through pipe 36, passes through manifold 35, port 60, port 61 and manifold 31 to pass through elbow 30 to the lower end of the jack cylinder 20. This fluid being under high pressure forces the piston 22 of the jack upwardly in cylinder 20 and operates the sucker rod R upwardly.

As the pump 34 operates to force the jack piston upwardly, the operating fluid is supplied to the intake of the pump through pipe 39, the fluid being supplied to the pipe 39 from the tank 41 of the accumulator from which it flows through pipe 43 through manifold 44 and port 62 into the upper end of cylinder 51. From the upper end of cylinder 51 the fluid is conducted by manifold 57 to the lower end of the cylinder 51 from which it enters the pipe 39 to be conducted directly to the intake of pump 34.

When the valve element 52 is in the up position shown in Fig. 5 of the drawings, the lowermost head 53 separates port 60 from port 61 so that flow no longer passes to the pump jack A but rather passes through cylinder 51 from port 60 to port 62, from which it passes through manifold 44 to pass to the tank 41 of the accumulator through the pipe 43. The uppermost head 53 of the valve element separates the port 62 from the end port 58 at the upper end of the cylinder. With the lowermost head 53 elevated, port 61 is opened to the lower end portion of the cylinder 51 so that fluid from the jack is free to flow through elbow 30 to manifold 31 into the lower end portion of cylinder 51 and out through pipe 39 to enter the suction of the pump 34.

The operating means E serves to operate or reciprocate the valve element 52 of valve D and in the preferred form of the invention it is a fluid pressure actuated means and is shown as a cylinder and piston mechanism. A feature of the present invention is the combining of the means E with the valve D so that these elements form a simple compact unitary structure and, in accordance with the preferred form of the invention, the means E is not only mounted on, supported by or combined with the valve D, but is actually contained therein or housed thereby. The means E and the valve D are combined or coupled operatively so that the movable element of means E is directly coupled to the movable element of the valve D and fluid being handled by the valve is utilized in the operation of the means E so that the means E is operated without loss of fluid, that is, without requiring exhaust of fluid making repressuring thereof necessary. In the particular form of the invention illustrated fluid being handled by the valve D is utilized to operate the means E in one direction only, operation in the other direction being effected by fluid pressure from a source other than the valve D.

In the preferred form of the invention as illustrated in the drawings the means E is characterized by a cylinder 70, a piston 71 operating in the cylinder 70, and a stem 72 coupled to the piston and projecting from the cylinder to connect with and operate the shiftable element 52 of valve D. In the drawings the stem 72 is shown continuous with the stem 54 of valve element 52.

The cylinder 70 is supported or carried by the valve D and in the preferred arrangement it is carried by the head or top end 55 of cylinder 51 of valve D. Cylinder 70 is shown as being integrally joined with the head 55 concentric with the cylinder 51 and is shown depending from the head to be within the cylinder 51.

In accordance with the present invention one end of the cylinder 70 is open to or in communication with the cylinder 51 of valve D, while the other end of the cylinder 70 has fluid supplied to it and exhausted from it by means of the pilot valve 80 of control means F. In the arrangement illustrated the lower end of cylinder 70 is open to or in communication with the upper end of cylinder 51, that is, with that portion of cylinder 51 above the uppermost head 53 of valve element 52. In this case the fluid present in the upper end portion of cylinder 51, which portion of the cylinder is normally in communication with the suction of the pump 34, normally and constantly acts upon the under or lower side of piston 71 tending to move it upwardly in cylinder 70.

It has been found in practice to be desirable to check the movement of piston 71 at the ends of its stroke and consequently check the motion of valve element 52 at the ends of its stroke. To impart a suitable checking or cushioning action an inwardly projecting flange 81 is provided in the cylinder 70 at its lower end portion and the flange has a central opening 82 fitting the stem 72 with clearance so that there is normally free flow between cylinder 70 and the upper end portion of cylinder 51. An enlargement or collar 83 is provided on the stem 72 in such position as to enter the opening 82 as the piston 71 approaches the upper end of its stroke. The collar 83 does not have a fluid tight fit in the opening 82, but fits it close enough so that there is a suitable checking action due to the fact that flow through the opening 82 is materially restricted. In like manner a collar 84 is provided on the stem 72 above the collar 83 and this collar enters the opening 82 as the piston 71 approaches the lower end of its stroke and, like the collar 83, it has the desired choking or checking action.

In the form of the invention illustrated a supplemental check is provided to dampen or check upward movement of the piston 71 as it approaches the upper end of its stroke. The supplemental means, as shown in Fig. 12 of the drawings, involves a flange 85 on the stem 72 immediately below collar 83 which flange fits into the lower end portion of cylinder 70 below flange 81 to act in the cylinder 70 so that the desired cushioning or checking action is obtained. It is to be understood, of course, that the fit of flange 85 in the lower end portion of cylinder 70 is not tight but is loose enough so that there may always be some flow of fluid between cylinder 70 and the upper end portion of cylinder 51.

The control means F acts to supply operating fluid to and to exhaust fluid from the upper end of cylinder 70 and operates in response to the position of the jack piston 22 in the cylinder 20. The means F is characterized, generally, by a pilot valve 80 best shown in Fig. 12 of the drawings, and a plurality of fluid handling connections all of which will be more fully described. In accordance with the preferred form of the invention the pilot valve 80 is mounted on or carried by the main valve D to be combined with the valve D and the means F to form a compact unit. In the case illustrated the pilot valve E is a slide or piston type valve transversely disposed on or immediately above the head 55 of valve D, and the pilot valve 80 is provided with a cap portion 85A which is secured to the head 55 and closes the upper end of cylinder 70.

The cylinder 86 of the pilot valve is carried by the cap 85A so that it extends transversely across the structure at the upper end of cylinder 70. One or more ports 87 extend through the side of the cylinder 86 and the plate carrying the cylinder to connect the interior of the cylinder 86 with the upper end of cylinder 70. An inlet port 88 is provided in the side of cylinder 86 and is supplied with high pressure operating fluid by means of a pipe 89. An outlet port 90 is provided in the side of cylinder 86 and is connected with an exhaust or outlet pipe 91. The ports 88 and 90 are spaced apart longitudinally of the cylinder 86 and are spaced in opposite directions from the ports 87 communicating with cylinder 70.

The shiftable valve element of the pilot valve 80 includes a central longitudinal stem 92 and various piston-like parts that are carried by the stem and which operate in the cylinder 86. The main piston 93 of the pilot valve controls communication between port 87 and the ports 88 and 90. When the piston 93 is in one position, for instance at the left, as shown in Fig. 12, it separates the port 88 and the port 87, allowing free flow from port 87 to the port 90, with the result that fluid is free to exhaust from the upper end of cylinder 70, in which case the fluid being handled by the valve D acts on the piston 71 moving it to its uppermost position, as shown in Fig. 12. When the piston 93 is moved to the other position or to the right, as shown in Fig. 9, it separates ports 87 and 90, leaving port 87 open to port 88 so that high pressure fluid from the pipe 89 is communicated to the cylinder 70 above the piston 71. The high pressure fluid thus admitted to cylinder 70 is such as to overcome the resistance of the fluid being handled by the upper end portion of valve cylinder 51, and therefore the piston 71 is moved to the down position, as shown in Fig. 9.

It is desirable, in practice, to balance the valve element of the pilot valve 80 and for this purpose pistons 94 and 95 are provided on the stem spaced from the piston 93 so that the pressures at the two sides of piston 93 are equalized or balanced, as will be apparent from an examination of Fig. 9 of the drawings.

In practice the high pressure fluid for operating the means E against the pressure that normally acts on piston 71 to move it to the up position may be taken from any part of the apparatus where high pressure fluid prevails. In the case illustrated the pipe 89 extends from port 88 to a point where it connects with the pipe 36 handling the discharge from pump 34. The exhaust or drain pipe 91 connected with port 90 may extend to any desired point where the fluid is allowed to discharge or escape. In the preferred form of the invention the pipe 91 extends to the reservoir G which is also connected with the accumulator C to receive excess fluid therefrom.

The movable element or valve of the pilot valve 80 is operated or shifted in response to the position of the jack piston 22 in the jack cylinder 20. In the form of the invention illustrated a plunger-like extension 95A is provided on one end of the valve element in cylinder 86 and operates in a cylinder 96 which is in communcation with the upper end portion of the jack cylinder 20 by means of a pipe 97. A plunger-like extension 98 on the other end of the valve element in cylinder 86 operates in a cylinder 99 which is in communication with a low pressure source such as the suction of pump 34, by means of a pipe 100. The pipe 100 is shown extending from the pilot valve to the pipe 39. Under normal conditions the low pressure prevailing at the pump suction is communicated by pipe 100 to cylinder 99 to act on plunger 98 and normally hold the valve in the cylinder 86 in one position, that is, to the right, as shown in Fig. 9, where high pressure fluid is admitted from pipe 89 to the cylinder 70 to move the element 52 of valve D to the down position shown in Fig. 7. When the piston of the jack reaches the upper end portion of its stroke it passes above or uncovers the connection of pipe 97 where it joins into the side of cylinder 20 so that the fluid under high pressure beneath the jack piston 22 is communicated through pipe 97 to the cylinder 96 to there act upon plunger 95A and move the valve element in the cylinder 86 to the left, as shown in Fig. 12, where high pressure fluid from pipe 89 is cut off from cylinder 70 and fluid is allowed to exhaust from cylinder 70 through pipe 91. In practice the plungers 95A and 98 may be varied as to size in order to properly operate under the pressure conditions available. In the case illustrated the plunger 95A is somewhat larger in diameter than plunger 98.

It will be understood, of course, that when the piston of the pump jack reaches the upper end of its stroke and the pilot valve 89 is operated, as just described, the fluid being handled by the valve D acts on the piston 71 to move it to the upper end of its stroke as shown in Fig. 12, so that the valve D is moved to the position shown in Fig. 5 of the drawings. With the valve D thus operated the flow is reversed so that high pressure fluid is exhautsed from the pump jack and is delivered by the valve to the accumulator through the pipe 43.

When the piston of the jack starts to descend it passes the point where pipe 97 joins the cylinder 20 making it necessary to provide a holding means to maintain the shiftable element of the pilot valve 89 to the left, as shown in Fig. 12, until the piston of the jack reaches the lower end of its stroke. For this purpose a piston 110 is provided on the stem 92 between pistons 95 and 95A and one or more ports 111 are provided in the side of cylinder 86 and are in communication with a pipe 112 which extends to the jack cylinder near the lower end thereof. When the shiftable element of the pilot valve 89 is to the left, as shown in Fig. 12, high pressure fluid from the jack cylinder beneath the piston of the jack is communicated by pipe 112 through the port 111 to the cylinder 86 to act on the piston 110 holding it to the left against the low pressure fluid admitted through pipe 100. When the piston 22 of the jack reaches the lower end of its stroke it uncovers the point at which the pipe 112 joins jack cylinder 20 so that high pressure is no longer communicated by pipe 112 to act on piston 110 with the result that the pressure communicated by pipe 100 immediately acts to shift the movable element of the pilot valve to the right or to the position shown in Fig. 9 of the drawings, in which position it remains until the jack piston has been operated to the upper end of its stroke. It is to be observed that when the parts are moved to the position shown in Fig. 9 the piston 110 is moved to a position where high pressure fluid from pipe 112 acts between pistons 110 and 95 without causing operation of the shiftable element of the pilot valve.

To facilitate shifting of the valve element of the pilot valve 89 in the manner hereinabove described breather openings 115 are provided in the cylinder 86 outward of pistons 94 and 110 so that the end portions of the cylinder 86 do not form traps or chambers that would otherwise prevent free operation of the mechanism. If there is fluid leaking in the pilot valve it will find its way to the breather openings 115 from which it may be conducted by drain lines 116 to a suitable point such as the reservoir G.

The feed means H involves the pump 47 which handles the fluid exhausted as the apparatus operates so that such fluid is returned to the system at a suitable pressure, for instance, at the pressure prevailing in the accumulator C. In the form of the invention illustrated and as described above, no fluid is exhausted by reason of operation of the pilot valve of the control means, but fluid is exhausted from the upper end of cylinder 70 of means E each time the means E is operated through one complete cycle of operation. It is this exhausted fluid which is received by the reservoir G and is picked up from the reservoir by a line 120 to be supplied to the intake of pump 47. The high pressure discharge line 121 from pump 47 extends to the accumulator C so that the fluid is returned to the system at this point.

In practice it is desirable that an air pump 49 be provided to operate so that suitable air pressure is maintained in the accumulator C above the fluid handled thereby. In the drawings the delivery line 125 from the compressor 49 of means J is shown extended to the accumulator C where a body of air is maintained under high pressure.

From the foregoing description it will be understood how the tanks 40 and 41 of the accumulator C are located at opposite sides of the pipes 36 and 39. The tanks may be like vertically disposed cylindrical tanks closed at their ends. The connection 42 between the tanks 40 and 41 is located at a suitable point above the bottom of tank 41 so that the portion of the tank 41 below the connection 42 forms a liquid well holding a suitable body or supply of liquid under high pressure ready to be passed by pipe 43 to the intake of pump 34 through the valve D when the apparatus is functioning to move the piston of the jack upwardly in the jack cylinder. The connection 42 serves as an overflow connection so that excess fluid that may accumulate in the well formed by tank 41 overflows into tank 40 to flow to the bottom thereof from which point it is drained by a connection 130 into a float controlled trip 131 through which it is discharged through a line 132 to the reservoir G. The tank 40 is thus maintained practically free of liquid so that it forms a seal carrying a body of air under high pressure and likewise that portion of tank 41 above connection 40 acts with the tank 40 in carrying air under high pressure.

In practice it is desirable to maintain pressure in the accumulator C so that it, in effect, balances the static load on the pump jack so that the accumulator, in effect, takes the place of the usual counterbalance commonly employed in pump operating mechanisms. It will be understood, of course, that the apparatus may include various safety devices such as safety valves, regulators, etc. For example, in order to maintain the desired high pressure in the accumulator C the line 125 from pump 49 of means J may be provided with a relief valve 135 set to open when a predetermined pressure has been exceeded. In the drawings the compressor and the relief valve 135 are shown in simple diagrammatic form, whereas it is to be understood that in practice any suitable form of compressor may be used and any control or regulating system suitable for the service to be performed may be used, as circumstances require.

The stop means L (see Figures 4 and 14 to 17, inclusive) is provided to stop operation of the apparatus in the event that any failure occurs resulting in improper stroking of the jack. For example, in practice various conditions may develop which will cause the apparatus to leak, bind, or otherwise fail so that the jack is not operated at the proper rate. When such conditions develop, it is desirable that the entire apparatus be shut down until necessary repairs or adjustments are made. The means L provided by the present invention provides a positive stop valve 150 in the hydraulic system, for instance, in the pipe 43 which conducts fluid from the accumulator C to the valve D, and it also provides a switch 151 operatively connected with the prime mover 11 by a line 152 carrying a suitable control circuit so that when the switch 151 is operated the prime mover is stopped or cut out of operation. The stop valve 150 is of the fluid pressure operated type. Normally it is held open by suitable spring means, not shown, and its operating means is connected with a line 155 so that when fluid under pressure is supplied to the line 155 the valve 159 is closed. The line 155 is connected with a source of fluid under high pressure by a line 156 through a valve 157. In the case illustrated the line 155 is connected with the accumulator C so that the pressure maintained in the accumulator is available through the valve 157 to operate the stop valve 159.

The valve 157 is shown as a slide valve normally closed and including a cylinder 160 with a valve element 161 slidable in the cylinder 160. A stem 162 projects upwardly from the valve element 161 and carries a head 163 which engages and operates the switch 151 when the valve 161 is moved to a position connecting line 156 with line 155. (See Fig. 17.) A spring 164 is provided to normally act on head 163 to hold the parts in position where the valve 157 is closed as shown in Fig. 14.

A timer or time delay means 170 is provided for operating the valve 157 to open it when the rate of operation of the apparatus drops below a predetermined value. In the form of the invention illustrated the timer 170 is a gravity actuated mechanism hydraulically set and having a hydraulic time delay governing gravity operation. In the form of mechanism shown on sheet 7 of the drawings a stem 172 depends from the valve 157 into a cylinder 173. A weight 174 operates in the cylinder 173 and surrounds the stem 172. Spaced collars 175 and 176 are fixed to the stem 172 within the cylinder 173. When the weight 174 is moved to the upper end of the cylinder it engages collar 176 moving the stem 172 to an up position where the valve 167 is closed. When the weight or piston reaches the lower end of its stroke in the cylinder 173 it engages the collar 175 moving the stem 172 down with consequent opening of valve 157.

The cylinder 173 is connected in the hydraulic system so that it is supplied with fluid under pressure to move the weight or piston 174 to the upper position once during each cycle of operation of the apparatus. In the case illustrated the pipe 91 leading from the pilot valve of means F connects into the bottom of cylinder 173 and extends from a port 180 in the side of cylinder 173 to the reservoir G. In other words, the cylinder 173 is connected in series in the pipe 91 so that when flow occurs in pipe 91 fluid is admitted into the lower end of cylinder 173 and in practice this fluid is under sufficient pressure to move the piston 174 to the upper end of cylinder 173. The port 180 is so located in the side of cylinder 173 that when the piston 174 is up, as shown in Fig. 14, the port 180 is uncovered allowing circulation to continue through the cylinder 173. A by-pass 181 is provided in the cylinder 173 above the port 180 to allow fluid to escape from above the piston 174 as the piston moves up above the port 180.

When flow of fluid through pipe 91 has stopped as a result of draining of fluid from the means E above the piston 71, the piston 174 is free to move down in cylinder 173 under the action of gravity until it strikes collar 175 causing opening of valve 157. It will be apparent from examination of Fig. 14 of the drawings that when the piston 174 starts down it traps a body of fluid beneath it so that downward movement can only occur as fast as fluid may leak past the piston and if the piston is properly fitted there may be little or no downward movement thereof. In accordance with the present invention I provide an opening 190 through the piston and I provide a needle valve 191 for regulating the opening 190. Thus, as gravity acts on the piston 174 fluid flows from beneath the piston up through the opening 190 past the valve 191 to the space above the piston. It will be apparent that by setting or regulating the valve 191 the desired rate of descent of the piston 174 may be gained. In practice the valve 191 is set so that the piston 174 never reaches the lower end of its stroke while the apparatus is operating at a normal speed. However, should the rate of operation of the apparatus decrease a predetermined amount from the desired normal, then the piston 174 will have time to descend and depress the stem 172 so that valve 157 is opened. When valve 157 is opened, the stop valve 159 is closed and the switch 151 is operated, all with the result that the entire apparatus is rendered inoperative. The construction of the main valve and its operator per se forms the subject matter of a divisional application, Serial No. 258,709, filed November 28, 1951, and therefore is not claimed per se in the present application, but only in combination with the other parts of the pumping unit.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A pumping unit comprising a main cylinder, a ram reciprocable in said cylinder, a motivating pump having an intake and a discharge, an accumulator tank adapted to contain hydraulic fluid and compressed air, a four-way main valve, piping connecting said main valve with said pump intake and discharge, with said tank and with said cylinder, said main valve having a position in which it establishes communication between the piping connected with said pump intake and said tank and between that connected with said pump discharge and said cylinder for an upstroke of said ram and a second position in which it establishes communication the opposite way for a downstroke, means for operating said main valve at the ends of the strokes to reverse the ram, a normally open shut-off valve in the piping connected with said tank, means for automatically closing said shut-off valve whenever said ram moves at a speed below a predetermined minimum and thereby preventing loss of compressed air and hydraulic fluid from said tank, and means for stopping said pump when said shut-off valve closes.

2. A pumping unit comprising a main cylinder, a ram reciprocable in said cylinder, a motivating pump having an intake and a discharge, an accumulator tank adapted to contain hydraulic fluid and compressed air, a four-way main valve, piping connecting said main valve with said pump intake and discharge, with said tank and with said cylinder, said main valve having a position in which it establishes communication between the piping connected with said pump intake and said tank and between that connected with said pump discharge and said cylinder for an upstroke of said ram and a second position in which it establishes communication the opposite way for a downstroke, fluid pressure means for shifting said main valve between these positions, a pilot valve for operating said fluid pressure means at the ends of the ram strokes, a reservoir, additional piping for supplying hydraulic fluid under pressure to said pilot valve and said fluid pressure means and for draining fluid therefrom to said reservoir, a normally open shut-off valve in the piping connected with said tank, timing means connected with said additional piping for automatically closing said shut-off valve whenever said ram moves at a speed below a predetermined minimum and thereby preventing loss of compressed air and hydraulic fluid from said tank, and means for stopping said pump when said shut-off valve closes.

3. A pumping unit comprising a main cylinder, a ram reciprocable in said cylinder, a motivating pump having an intake and a discharge, an accumulator tank adapted to contain hydraulic fluid and compressed air, a four-way main valve, piping connecting said main valve with said pump intake and discharge, with said tank and with said cylinder, said main valve having a position in which it establishes communication between the piping connected with said pump intake and said tank and between that connected with said pump discharge and said cylinder for an upstroke of said ram and a second position in which it establishes communication the opposite way for a downstroke, fluid pressure means for shifting said main valve between these positions, a pilot valve for operating said fluid pressure means at the ends of the ram strokes, a reservoir, additional piping for supplying hydraulic fluid under pressure to said pilot valve and said fluid pressure means and for draining fluid therefrom to said reservoir, a pump for returning fluid from said reservoir to said tank, a normally open shut-off valve in the piping connected with said tank, a timer in the piping through which fluid drains to said reservoir and being responsive to the length of interval during which there is no drainage, which interval represents one ram stroke, said timer automatically closing said shut-off valve when the ram stroke takes longer than a predetermined interval, and means for stopping said pump when said shut-off valve closes.

4. A pumping unit comprising a main cylinder, a ram reciprocable in said cylinder, a motivating pump having an intake and a discharge, an accumulator tank adapted to contain hydraulic fluid and compressed air, a four-way main valve, piping connecting said main valve with said pump intake and discharge, with said tank and with said cylinder, said main valve having a position in which it establishes communication between the piping connected with said pump intake and said tank and between that connected with said pump discharge and said cylinder for an upstroke of said ram and a second position in which it establishes communication the opposite way for a downstroke, double acting fluid pressure means exposed on one side to pressure from within said main valve for shifting said main valve in one direction and to pressure from without for shifting said main valve in the other direction, a pilot valve for operating said fluid pressure means at the ends of the ram strokes, a reservoir, additional piping for supplying hydraulic fluid under pressure to said pilot valve and said fluid pressure means and for draining fluid from the latter via said pilot valve to said reservoir when pressure within said main valve acts thereon, a pump for returning fluid from said reservoir to said tank, a normally open shut-off valve in the piping connected with said tank, a timer in said additional piping for automatically closing said shut-off valve whenever said ram moves at a speed below a predetermined minimum, and means for stopping said pump when said shut-off valve closes.

5. In a pumping unit which comprises a main cylinder, a ram reciprocable in said cylinder, a motivating pump, an accumulator tank adapted to contain hydraulic fluid and compressed air, a four-way main valve, piping connecting said main valve with said pump, said tank and said cylinder, and means for operating said main valve at the ends of the ram strokes and thereby reversing the ram, the combination with said accumulator tank of a normally open shut-off valve in the piping connected therewith, a timer in said main valve operating means connected with said shut-off valve, said timer being responsive to the interval required for a ram stroke and adapted to close said shut-off valve whenever the ram speed is below a predetermined minimum, and means for stopping said pump when said shut-off valve closes.

6. In a pumping unit which comprises a main cylinder, a ram reciprocable in said cylinder, a motivating pump, an accumulator tank adapted to contain hydraulic fluid and compressed air, a four-way main valve, piping connecting said main valve with said pump, said tank and said cylinder, and means including a fluid pressure device, a pilot valve and additional piping for operating said main valve at the ends of the ram strokes and thereby reversing the ram, the combination with said accumulator tank of a normally open shut-off valve in the piping connected therewith, a fluid actuated timer in said additional piping connected with said shut-off valve, said timer closing said shut-off valve whenever the ram speed is below a predetermined minimum, and means for stopping said pump when said shut-off valve closes.

7. In a pumping unit which comprises a main cylinder, a ram reciprocable in said cylinder, a motivating pump, an accumulator tank adapted to contain hydraulic fluid and compressed air, a four-way main valve, piping connecting said main valve with said pump, said tank and said cylinder, and means including a fluid pressure device, a pilot valve and additional piping for operating said main valve at the ends of the ram strokes and thereby reversing the ram, the flow of fluid during an upstroke being from said tank via said pump and said main valve to said cylinder and during a downstroke being from said cylinder via said main valve and said pump to said tank, the combination with said tank of a device for preventing loss of fluid when the speed of said ram slows below a predetermined minimum comprising a normally open shut-off valve in the piping connected with said tank, a fluid actuated timer in said additional piping connected with said shut-off valve, said timer acting to close said shut-off valve when the flow of fluid through said additional piping to shift said main valve is delayed beyond a predetermined interval, and means for stopping said pump when said shut-off valve closes.

8. A pumping unit comprising a main cylinder, a ram reciprocable in said cylinder, a motivating pump, an accumulator tank adapted to contain hydraulic fluid and compressed air, a four-way main valve, piping connecting said main valve with said pump, said tank and said cylinder, a double acting piston and cylinder connected with said main valve and actuated in one direction by pressure within said main valve and in the other direction by pressure from said pump, a pilot valve operated by said ram at the ends of its strokes for controlling the application and relief of the latter pressure and thereby operating said main valve and effecting reversals of said ram, a reservoir, piping extending to said reservoir from said pilot valve for relieving said second named cylinder when its piston is actuated by pressure within said main valve, said second named cylinder being relieved directly to said main valve when its piston is actuated by pressure from said pump, and an auxiliary pump and piping for returning fluid from said reservoir to said tank, said auxiliary pump normally handling only fluid relieved from said second named cylinder on actuation of its piston in one direction and incidental leakage.

9. A pumping unit comprising a main cylinder, a ram reciprocable in said cylinder, a motivating pump, an accumulator tank adapted to contain hydraulic fluid and compressed air, a four-way main valve including a body and a slide reciprocable therein, piping connecting said valve body with said pump, said tank and said cylinder, a cylinder joined to and communicating at one end with said valve body, a double acting piston reciprocable therein and joined to said valve slide, said piston being actuated in one direction by pressure from within said valve body and in the other direction by pressure from said pump, a pilot valve operated by said ram at the ends of its strokes for controlling application and relief of the latter pressure and thereby shifting said piston and said valve slide and effecting reversals of said ram, a reservoir, piping extending to said reservoir from said pilot valve through which fluid flows from said second named cylinder on relief of said latter pressure during movement of said piston and valve slide imparted by pressure within said valve body, said second named cylinder being relieved to said main valve body during movement of said piston and valve slide imparted by pressure from said pump, and an auxiliary pump and piping for returning fluid from said reservoir to said tank, said auxiliary pump normally handling only fluid relieved from said named cylinder on movement of its piston in one direction and incidental leakage.

10. In a pumping unit which comprises a main cylinder, a ram reciprocable in said cylinder, a motivating pump, an accumulator tank adapted to contain hydraulic fluid and compressed air, a four-way main valve including a body and a slide reciprocable therein, and piping connecting said main valve with said pump, said tank and said cylinder, the combination with said main valve of an operating means comprising a cylinder joined to and communicating at one side with said valve body, a piston reciprocable therein and joined to said valve slide, and a pilot valve operated by said ram at the ends of its strokes for controlling application and relief of pressure to the opposite side of said piston and cylinder, relief of said last named cylinder on the stroke of its piston in one direction and incidental leakage accounting for the only losses of hydraulic fluid from the system.

HERBERT HARVEY.

References Cited in the file of this patent

UNITED STATES PATENTS

| Number | Name | Date |
|---|---|---|
| 220,479 | Johnson et al. | Oct. 14, 1879 |
| 1,136,899 | Greer | Apr. 20, 1915 |
| 1,214,496 | Armstrong | Feb. 6, 1917 |
| 1,909,659 | Clapp | May 16, 1933 |
| 2,019,353 | Lower | Oct. 29, 1935 |
| 2,167,623 | Britter | Aug. 1, 1939 |
| 1,168,711 | Kyle | Aug. 8, 1939 |
| 2,277,761 | Hubbard | Mar. 31, 1942 |
| 2,325,138 | Kyle et al. | July 27, 1943 |
| 2,367,248 | Vickers et al. | Jan. 16, 1945 |
| 2,390,124 | Ross | Dec. 4, 1945 |
| 2,449,554 | Helber et al. | Sept. 21, 1948 |
| 2,489,412 | Harvey | Nov. 29, 1949 |
| 2,504,218 | Noll et al. | Apr. 18, 1950 |
| 2,562,837 | White | July 31, 1941 |